Dec. 12, 1933.  P. R. DIJKSTERHUIS  1,939,338
ELECTRIC INSTALLATION
Filed Nov. 21, 1929    2 Sheets-Sheet. 1

Inventor:
P. R. Dijksterhuis,
by Langner, Parry, Card & Langner
Att'ys.

Dec. 12, 1933.    P. R. DIJKSTERHUIS    1,939,338
ELECTRIC INSTALLATION
Filed Nov. 21, 1929    2 Sheets-Sheet 2

Inventor:-
Popko Reinder Dijksterhuis
by
Atty.

Patented Dec. 12, 1933

1,939,338

UNITED STATES PATENT OFFICE 1,939,338

ELECTRIC INSTALLATION

Popko Reinder Dijksterhuis, Eindhoven, Netherlands, assignor to N. V. Philips Gloeilampenfabrieken, Eindhoven, Netherlands, a limited liability company of the Netherlands Application November 21, 1929, Serial No. 408,893, and in the Netherlands December 19, 1928

6 Claims. (Cl. 172—293)

If it is desired to run a motor at a definite, perfectly constant angular velocity, this can be effected by using a synchronous motor and by ensuring that the frequency of the supplied alternating current has the desired value and remains absolutely constant. The latter two requirements can be met, for example, by causing primary current impulses to be produced under the control of a pendulum and by multiplying the frequency of these impulses one or several times in one of the ways known for this purpose.

This method, however, can be utilized in practice only with synchronous motors of small power. The invention has for its object to suggest a means whereby it is rendered possible in a simple manner to cause motors of any given high power and of any type (either alternating current or a direct current motor) to run exactly in step with a regulating-motor of any small power. In this case the said regulating motor can be driven in the above indicated manner so as to have the desired, constant angular velocity.

The invention consequently includes an electric installation consisting inter alia of a principal motor and of an auxiliary motor of comparatively much lower power with which the principal motor has to go in synchronism. According to the invention, this is effected with the aid of a set of contacts which are insulated from one another and between which is located with some play a pointer, needle or lug, which in the case of deviation from the synchronism engages one of the said contacts owing to which one of the two circuits is closed and consequently the running of the principal motor is accelerated or retarded according to circumstances.

Further features of the invention will appear from the following description in which a diagrammatic mode of realization is described with reference to the accompanying drawings in which Figure 1 represents the diagram of connections as far as it is important for the right understanding of the invention.

Figure 1:
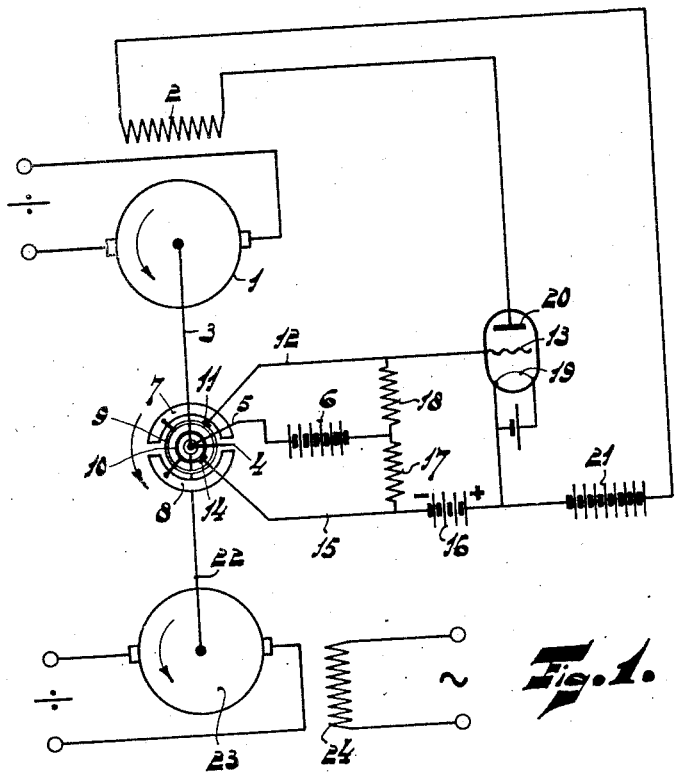
Figure 2:
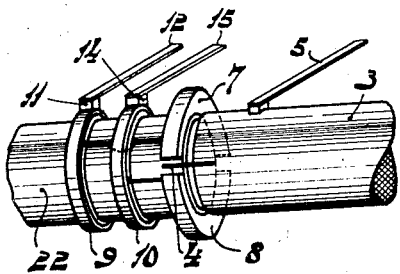
Figure 2 represents diagrammatically an arrangement for the contacts provided on the shafts rotating in synchronism.

Referring to Figure 1, the armature, the field-winding (direct current) and the shaft of the principal motor are indicated by 1, 2 and 3 respectively. This shaft is provided with a needle, lug or pointer 4 which is in electrical connection (for example, by means of a brush adapted to slip on the shaft 3, as shown in Figure 2) with a conductor 5 which leads to the positive terminal of a battery 6.

The needle 4 is located with some play between two contact segments 7 and 8 which are insulatedly mounted on a shaft 22 of a small synchronizing or auxiliary motor 23, 24 whose armature 23 is energized with direct current and to the stator-winding 24 of which is supplied alternating current of the desired and constant frequency. Slip-rings 9 and 10 are electrically connected to the segments 7 and 8 respectively.

On the slip ring 9 rests a brush 11 whence a conductor 12 leads to the control grid 13 of a thermionic device which further comprises an incandescent cathode 19 and an anode 20 and of which the anode current, which is supplied by a battery 21 passes through the field coil 2 of the principal motor.

On the slip ring 10 rests a brush 14 whence a conductor 15 leads to the minus-terminal of a battery 16 and at the same time to one of the ends of a resistance 17 which has its other end connected to the minus-terminal of the battery 6. From the said minus-terminal leads a resistance 18 to the conductor 12 which is connected to the grid 13.

The installation functions as follows:

As long as the shafts 3 and 22 rotate at the same speed and the needle 4 is not in contact with either of the two segments 7 and 8, a negative tension is applied to the grid 13, said tension being supplied by the battery 16 through the resistances 17 and 18 connected in series.

When the shaft 3 begins to rotate at too small a speed, the needle 4 comes into contact with the segment 8 so that now the batteries 16 and 6 are located in series and the total amount of the voltages supplied by the said batteries is applied as a negative bias to the grid 13. The current sent by the battery 21 into the anode circuit consequently decreases, the field of the coil 4 weakens and the armature 1 commences to rotate at a higher speed.

When on the contrary the shaft 3 rotates at too high a speed, the pointer 4 will quickly come into contact with the segment 7 so that the batteries 6 and 16 will oppositely act on the grid 13 in the circuit battery 16 resistance 17, battery 6, connection 5, needle 4, segment 7, brush 11, connection 12, grid 13. Since the positive terminal of the battery 6 is located on the side of the grid 13, the potential of the latter becomes less negative if necessary even positive. At any rate, the anode current flowing through the field winding 2 will be stronger than when the needle 4 engages either of the two segments so that the motor will be retarded.

The resistances 17 and 18 are to be chosen of such value that the battery 6 practically cannot discharge itself through them. This is essential because the battery 6 is bridged by one of the said resistances whenever the needle 4 engages one of the contacts 7 and 8.

The construction may be such that the needle 4 is rigidly secured to the shaft 3. In this case the needle must be rigid enough to carry along with it the synchronizing motor 23 by the segment 7 when the principal motor 1 is starting up.

It is also possible, however, to cause the needle 4 to be carried along with some slight friction by its shaft, in which event the two motors may start independently of each other as they are not mechanically coupled.

It is evident that it is also possible to mount the needle 4 on the shaft 22 and the segments 7 and 8 on the shaft 3 because it is only the relative movement of the said members that matters.

Figure 3:
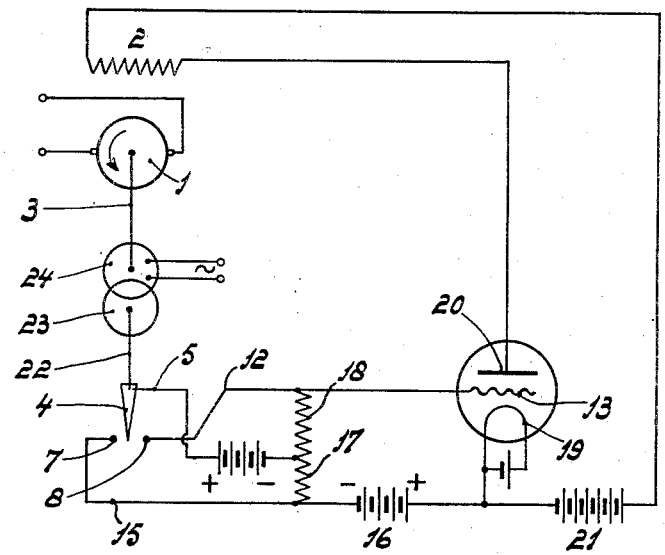
Fig. 3 is a schematic representation of another form of my invention.

Another possibility, which also falls within the scope of the invention is illustrated in Fig. 3. It consists in causing the alternating current winding 24 of the synchronizing motor to follow the rotatory motion of the shaft 3 of the principal motor, in such manner that the pulsating field of the synchronizing motor spatially stands still as long as the shaft 3 has a definite angular velocity which depends on the frequency of the current in 24. Both the armature 23 and the shaft 22 to which the needle is secured also stand still and they will only start rotating in either of the two directions as soon as the synchronism is broken. In that case the needle cooperates in the above-indicated manner with a pair of fixed contacts of course, the reverse may also be the case owing to which the speed of the principal motor is corrected in a manner quite analogous to that above described.

If the principal motor is an alternating current motor, the coil 2 may be wound on an iron core whose magnetic saturation is influenced in that case by the said coil. On the said core are also wound one or more additional windings which are included in one or more circuits of the principal motor. The self-inductance of these circuits can be influenced in the above-mentioned manner so that in this case too the speed of the motor can be controlled by the anode current of the thermionic device 19, 13, 20.

What I claim is:—

1. An electric installation comprising a principal motor and an auxiliary motor of much lower rated power than the principal motor, and means to keep the speed of the principal motor constant, said means comprising a set of contacts insulated from each other, and a pointer, said pointer and contacts varying in position in respect to each other depending on the speed variations of the principal motor relative to that of the auxiliary motor, said pointer upon a definite speed variation, engaging one or the other of said contacts, circuits of different potential and polarity characteristics connected to said contacts one of which is closed upon engagement of the pointer with the corresponding contact, a thermionic device having input electrodes, means for connecting said input electrodes with said circuits, and an output circuit for said device which acts on the speed of the principal motor.

2. An electric installation comprising a principal motor and an auxiliary motor of much lower rated power than the principal motor, said auxiliary motor being driven at a desired speed, and means to keep said principal motor in synchronism with said auxiliary motor, said means comprising a set of contacts insulated from each other, and a pointer, said pointer and contacts varying in position in respect to each other depending on the speed variations of the principal motor relative to that of the auxiliary motor, said pointer upon a definite speed variation, engaging one or the other of said contacts, circuits of different potential and polarity characteristics connected to said contacts one of which is closed upon engagement of the pointer with the corresponding contact, a thermionic device having input electrodes, means for connecting said input electrodes with said circuits, and an output circuit for said device which acts on the speed of the principal motor.

3. An electric installation comprising a principal motor and an auxiliary motor of much lower rated power, said auxiliary motor running at a desired speed, and means to maintain the principal motor in synchronism with the auxiliary motor, each motor having a shaft, a set of contacts insulated from each other and mounted on one of said shafts, and a pointer mounted on the other of said shafts, said pointer varying its position in respect to said contacts and upon a definite speed variation engages one of said contacts, slip rings mounted on the shaft which carries said contacts and connected with said contacts, brushes coacting with said slip rings, and circuits of different voltage and polarity connected to said brushes, each circuit being closed upon engagement of the pointer with one of said contacts, and a thermionic device adapted to be connected in said circuits, said thermionic device having an output circuit acting upon the speed of the principal motor.

4. An electric installation comprising a principal motor and an auxiliary motor of much lower rated power, said auxiliary motor running at a desired speed, and means to maintain the principal motor in synchronism with the auxiliary motor, each motor having a shaft, a set of contacts insulated from each other and mounted on one of said shafts, and a pointer mounted on the other of said shafts, said pointer varying its position in respect to said contacts and upon a definite speed deviation engages one of said contacts, slip rings mounted on the shaft which carries said contacts and connected with said contacts, brushes coacting with said slip rings, and circuits connected to said brushes, each circuit being closed upon engagement of the pointer with one of said contacts, a thermionic device having input and output electrodes, means for connecting the said input electrodes with the said circuits, the total voltage operative in the input circuit for one circuit being different from that for the other, and a circuit for the output electrodes of the thermionic device which acts on the speed of the principal motor.

5. An electric installation comprising a principal motor to be maintained at a constant speed and an auxiliary motor of much lower rated power, each motor having a shaft, an alternating current winding for the said auxiliary motor, the said alternating current winding being mounted on the same shaft as the principal motor, a set of contacts insulated from each other, a pointer mechanically connected with the armature of the auxiliary motor for playing between the said contacts and upon a definite deviation of speed of the principal motor, engaging one or the other of the said contacts, circuits connected to the said contacts, the corresponding one of which circuits is closed upon engagement of the pointer with one of the contacts, a voltage source, a thermionic device having a control electrode connected to one of said contacts, a cathode connected over the voltage source to the other contact, a resistance connected between the control electrode and the last-mentioned contact and a second voltage source, an intermediate point on said resistance being connected over said second voltage source to the point, the circuits thus impressing on the control electrode a bias of quantity and polarity dependent on the momentary speed of the principal motor, and an output circuit for said thermionic device including and supplying the field winding of said principal motor depending upon the bias of the control electrode.

6. An electric installation comprising a principal motor and an auxiliary motor of much lower rated power than the principal motor, means to keep the speed of the principal motor constant, said means comprising a set of contacts insulated from each other, and a pointer engaging with one or the other of said contacts, depending upon whether the principal motor runs slower or faster than the auxiliary motor, circuits of different potential and polarity characteristics connected to said contacts, one of which circuits is closed upon engagement of the pointer with the corresponding contact, a thermionic device having its plate circuit connected across the field of the principal motor, and having input electrodes, and means connecting said input electrodes with said first-mentioned circuits.

POPKO REINDER DIJKSTERHUIS.